United States Patent [19]

Neumueller

[11] Patent Number: 4,566,827
[45] Date of Patent: Jan. 28, 1986

[54] BALLNOSE END MILL AND INSERT THEREFOR

[75] Inventor: Ronald L. Neumueller, Rockford, Ill.

[73] Assignee: Ingersoll Cutting Tool Company, Rockford, Ill.

[21] Appl. No.: 737,576

[22] Filed: May 24, 1985

Related U.S. Application Data

[63] Continuation of Ser. No. 676,685, Nov. 30, 1984, abandoned, which is a continuation of Ser. No. 428,286, Feb. 22, 1983, abandoned.

[51] Int. Cl.$^4$ ............................................. B23C 5/02
[52] U.S. Cl. ....................................... 407/42; 407/54; 407/113
[58] Field of Search .................. 407/34, 40, 42, 47, 407/48, 53, 54, 62, 113–116

[56] References Cited

U.S. PATENT DOCUMENTS

| | | | |
|---|---|---|---|
| 3,380,137 | 4/1968 | MacPetrie et al. | 407/62 |
| 3,551,978 | 1/1971 | Berry | 407/62 |
| 3,696,484 | 10/1972 | Spriggs | 407/42 |
| 4,132,493 | 1/1979 | Hosoi | 407/42 |
| 4,175,896 | 11/1979 | Kishinami et al. | 407/40 |
| 4,252,480 | 2/1981 | Mizuno et al. | 407/54 |
| 4,411,564 | 10/1983 | Johnson | 407/113 |

FOREIGN PATENT DOCUMENTS

| | | | |
|---|---|---|---|
| 111188 | 8/1979 | Japan | 407/54 |
| 145086 | 11/1979 | Japan | 407/113 |
| 157418 | 12/1980 | Japan | 407/42 |

*Primary Examiner*—Leonidas Vlachos
*Assistant Examiner*—Jerry Kearns
*Attorney, Agent, or Firm*—Fitch, Even, Tabin & Flannery

[57] ABSTRACT

A ballnose end mill with identical on-edge convex inserts is capable of drilling and milling, and apportioning the major milling load between the inserts.

2 Claims, 7 Drawing Figures

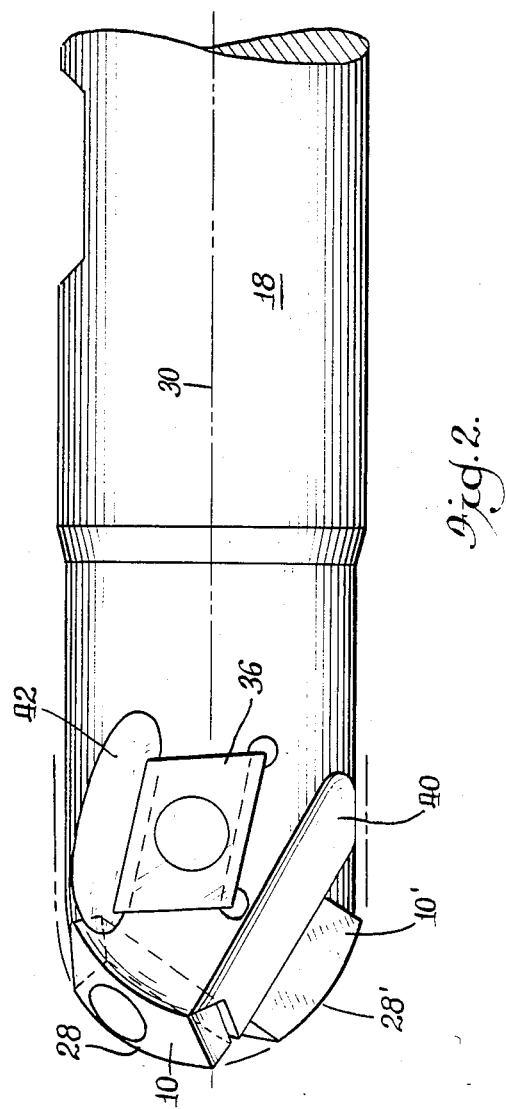
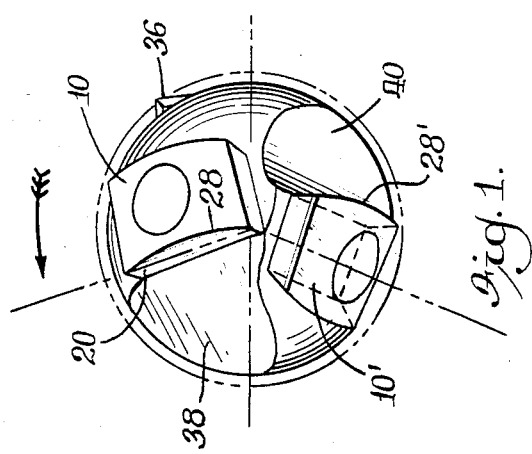

BALLNOSE END MILL AND INSERT THEREFOR

This application is a continuation of application Ser. No. 676,685 filed Nov. 30, 1984, as a continuation of application Ser. No. 468,286, filed Feb. 22, 1983, both now abandoned.

This invention relates to ballnose end mills of the kind having relaceable cutting inserts.

The invention in particular is a ballnose end mill having so-called "on-edge" inserts, i.e., inserts in which the cutting force is transmitted through one of the major dimensions of the insert, rather than through its short dimension.

On-edge inserts are demonstrably more resistant to breakage from shock loads, and while their superiority in this respect is well-known, they have not heretofore been applied successfully to ballnose end mills or other rotating tools intended for fillet cutting, such as are used, for example, in the manufacture of dies for press work, or simply for the machining of machine parts, or structural components of aircraft, for example, where filleting is essential for the prevention of undue stress concentration.

It is accordingly the objective of the present invention to provide a ballnose end mill which employs inserts of cutting material which are configured for on-edge orientation and which, in preferred form, are not only replaceable, but indexable, i.e., which have multiple cutting edges which can be used in succession as each cutting edge becomes dull or eroded.

It is a further objective to provide an indexable on-edge insert for ballnose end mills and comparable fillet-cutting usage which is so configured that two such identical inserts properly mounted in a tool holder sweep the desired hemispherical path, are capable equally of axial plunge cutting, i.e., drilling, to initiate a cut, and share the major cutting load between them in a substantial overlap of their respective cutting paths, with at least one of the cutters havng its cutting edge oriented for maximum bevel-cutting effectiveness, i.e., with negative radial rake and positive axial rake, in accordance with known cutting principles.

The invention is explained in the following detailed specification taken in conjunction with the accompanying drawings in which:

FIG. 1 is an end view of the ballnose end mill of my invention seen from the cutting end;

FIG. 2 is a side view of the same similarly showing the two inserts which provide the hemispherical sweep and a third and optional insert which cuts an essentially cylindrical path tangent to the hemispherical cutting path swept by the two curved-edge cutters;

Figure 3:
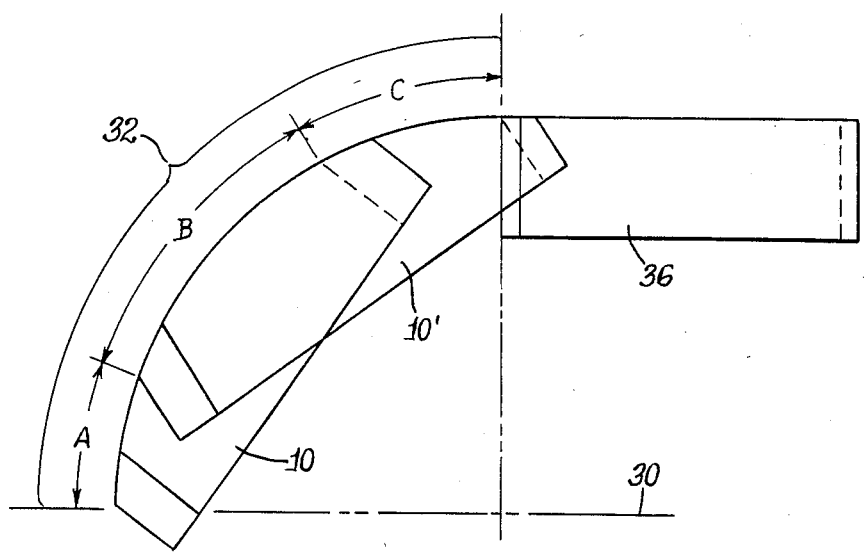
Figure 4B:
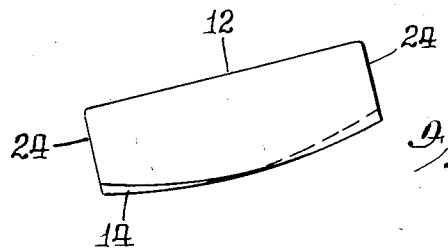
Figure 4A:
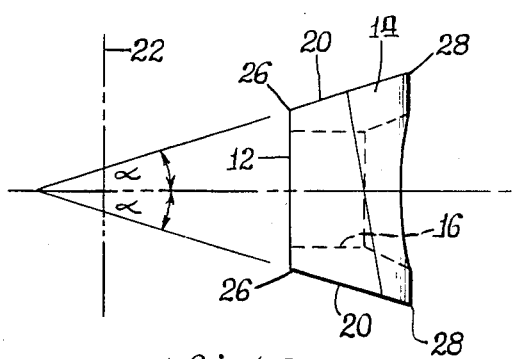
Figure 4C:
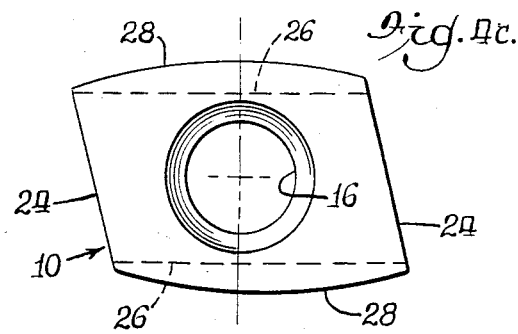
Figure 4D:
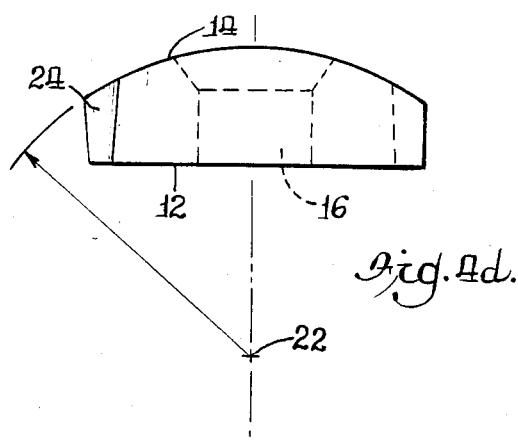

FIG. 3 is a diagram of the profile of the cutting path taken on a radial plane through the axis of the tool holder to show the relationship of each insert to the composite resulting cutting path; and FIGS. 4a–d inclusive are enlarged end, back, top, and front views respectively of the curved-edge, indexable, on-edge insert which is a key element of the invention and which, when appropriately applied to a rotatable shank, provides the cutting path of circular-quadrant outline illustrated diagrammatically in FIG. 3.

Referring first to the several views of FIG. 4 for the details of the cutter itself, the on-edge insert 10 is a block of suitable cutting material, and is generally in the form of a flat, six-sided block having two major faces, viz., a flat, planar seating face 12 and an opposite face 14 which is convex. A hole 16, cored through the minor dimension of the block and countersunk at the convex face 14, receives a fastener, not shown, which anchors the insert 10 in place in a recess provided for it in the tool-holder 18 (FIGS. 1 and 2), as later explained.

The convex major face 14 of the insert is cylindrical in the illustrated case, and is limited by four minor boundary surfaces. In the preferred form, two of these are rake or cutting faces 20 which are formed as though cut by converging planes which make equal angles $\alpha$ with a bisecting plane perpendicular to the axis 22 of the cylindrical face 14 of the insert (FIG. 4a) and intersect the convex face 14 at an acute angle to form the curved cutting edge 28.

The other two minor boundary surfaces 24 are parallel planes perpendicular to the flat seating face 12 of the insert, but askew to the parallel edges 26 of the flat seating face 12 formed by the converging cutting faces 20. The cutting insert is therefore generally rhomboidal (FIG. 4c), its diagonally opposite corners being respectively acute and obtuse at the junctures of the cutting faces 20 with their respective adjacent end surfaces 24.

The radius of the cylindrical surface 14 in the illustrated case is the same as the radius of the intended hemispherical cutting path of the end mill, and while the cutting edge 28 of each of the two identical cutting faces of the insert is, in fact, elliptical in the plane of that face, the profile of the cutting path to be generated by the use of such inserts depends upon the orientation of the cutting edge, and, more particularly, upon the projection of the convex surface of the seated insert, along the rotational path, to a radial plane through the axis of rotation of the cutter.

That geometry is shown in FIGS. 1 and 2 which illustrate the composite cutting tool of the invention.

The hemispherical cutting path of the end mill of this invention is generated by two inserts 10 and 10' of the kind illustrated in FIG. 4 which are positioned at the nose of the tool holder 18 so as to sweep overlapping cutting paths which, projected to a radial plane through the axis 30 of the tool holder, extend as a circular quadrant 32 from the axis of rotation to the point of maximum radius measured from that axis (FIG. 3).

The point insert 10 is positioned with one of its cutting surfaces 20 essentially radially of the tool holder 18 and with the very end of its cutting edge 28 at the acute angle corner of the insert positioned at the rotational axis (compare FIGS. 1 and 2). From FIG. 1 the reason for the acute angle corner will be apparent, namely it provides a centering point to facilitate an axially plunging or drilling cut into the work, and at the same time provides clearance behind the cutting point. By the same token, the seating surface of the recess which receives the point insert 10 is pitched to drop the opposite and trailing edge of the insert, i.e., the reserve cutting edge, below the generally spherical outline traced by the active cutting edge during rotation.

The need for trailing clearance to prevent the insert from "heeling" on the freshly cut surface of the work, and the desirability of maintaining the direction of the cutting forces upon the tool holder as nearly tangential as possible, limit the dimension of the insert in the axial direction of its cylindrical surface. In end mills of very small diameter, space limitations may make it necessary to forego indexability in favor of solid support for a narrower single-edge insert.

The second or upper insert 10', identical in form and indeed interchangeable with the point insert 10, is positioned to sweep the spherical path from its major radius measured from the rotational axis of the cutter downwardly along the circular quadrant 32 of the cutting path (FIG. 3), but terminating well short of the point. Again referring to FIG. 1, the upper insert 10' is positioned with its cutting edge 28' approximately diametrically opposite the cutting edge of the point insert 10, but with a substantially different orientation. The seat of the recess for the upper insert 10' is pitched and configured to position the upper insert with negative radial rake and positive axial rake to provide the optimum orientation for the bevel cut which constitutes the major part of the cutting load of the upper insert. The benefits of such orientation for bevel cutting are well-known, having been disclosed in U.S. Pat. No. 2,186,417, issued in 1940 to the assignee of this invention.

It will again be apparent from FIG. 1 that the same rhomboidal shape which provides the cutting point of insert 10 is compensated by the positive axial rake of the upper insert 10' with the result that the cutting edge 28' of the upper insert 10' is fully backed throughout its entire length in opposition to the cutting forces while the insert 10' is adequately pitched to prevent the trailing, reserve cutting edge from heeling on the freshly cut work.

A third cutting insert 36 having a straight cutting edge is employed to extend the cutting path cylindrically tangent to the circular-quadrant projection 32 of the overlapped cutting paths of the two novel inserts 10 and 10' of this invention. The latter is preferably also of rhomboidal shape for the solid support of its cutting edge, although positioned with positive axial rake. The third insert is similarly pitched for assurance that its trailing reserve cutting edge is clear of the cut, and all three inserts are positioned with their active cutting edges trailing irregularly shaped and positioned chip gullets 38, 40 and 42 which are gashed in the body of the tool holder 18 at an angle to the axis of rotation to allow the chips to flow up and out when drilling, or indeed when feeding transversely of the cutter axis.

It may be appreciated from the foregoing descriptions of the individual cutting inserts 10 and 10' and of their orientations upon the tool holder 18 that the cutting edges 28 and 28' do not sweep a path which is precisely circular in the radial plane, but rather one whose radial projection deviates slightly elliptically from circular with a somewhat tighter radius of curvature. The deviation from circular, however, is very minor and essentially of no consequence in the contour machining involved, for example, in die work, nor in the machining of fillets for their own sake. Similarly, it will be appreciated that the axially raked straight cutting edge of the "cylindrical" insert 36 sweeps a path which is not precisely cylindrical, but rather hyperbolic. Again, however, this deviation from a truly straight surface tangent to the fillet generated by the ball nose is of no consequence in most applications and may be overcome by a mildly convex or helical cutting edge on the third insert for cutting applications where a more nearly plane surface must be left upon the work.

FIG. 3, as earlier noted, illustrates diagrammatically the projection of the several aforedescribed cutting paths upon a radial plane through the center line of the cutter, i.e., through the axis of rotation. Although FIG. 3 is diagrammatic rather than a precise orthographic projection, the cutter inserts 10, 10' and 36 are indicated generally in outline form projected upon a radial plane of the tool body. The matter to be observed is the degree to which the respective cutters 10 and 10' occupy the circular quadrant 32 of their combined cutting paths and, in particular, the overlap of those paths which permits the two cutters to share the major cutting load. For convenience, the portion cut only by the point insert 10 is labelled "A", the overlap portion "B", and the portion cut only by the upper insert 10' is labelled "C".

It is understood by those skilled in the art that the cutting load in zone "A", during ordinary transverse milling as distinguished from axial plunge cutting, i.e., drilling, is a very light load because of the chip-thinning effect resulting from the bevel of the cutting edge. On the other hand, in zone "C", swept only by the upper cutter 10', peripheral chip-thinning due to the transverse feed is drastic, but thinning attributable to bevel is negligible. Quantitatively, the greater metal removal rate occurs in the overlap zone "B" where, with the approximate diametrical placement of the cutting edges of the point insert 10 and upper insert 10', those inserts share the heavy load, each taking a new cut which is only half the thickness that would be encountered by a single cutter covering the same sector at the same feed rate.

The novel ballnose end mill of the invention is a heavy duty tool capable of withstanding heavy cutting loads because its inserts cut "on edge", i.e., they receive and transmit the cutting load essentially through a major dimension of the insert. Moreover, they are arranged to sweep paths which greatly overlap, making for greater tool life on both counts.

The individual novel insert is usable interchangeably in either nose position, i.e., as the point cutter 10 or as the upper cutter 10', and both are reversibly indexable to double their service in either role.

The features of the invention believed new and patentable are set forth in the following claims.

What is claimed:

1. A multiple-use indexable cutting insert for on-edge cutting in a ballnose end mill or the like comprising a block of cutting material having a first major face which is cylindrically convex, an opposite major face which is plane, rhomboidal in outline, with its opposite major edges in chordal relation to said cylindrical major face, and upon which the block is adapted to be seated in a recess in a tool holder, a pair of opposed, plane, minor boundary surfaces which intersect said plane rhomboidal face on said two major edges and diverge therefrom at equal angles to intersect said convex major face at an acute included angle to form therewith two substantially circular cutting edges on said boundary faces, a second pair of opposed, plane, minor boundary surfaces which intersect said plane rhomboidal face perpendicularly on its two minor edges, and a central bore extending between the major faces to receive a securing fastener, wherein said pair of diverging minor boundary surfaces constitute alternate rake faces and wherein said second pair of minor boundary surfaces, by their acute-angle intersection with said pair of diverging minor boundary surfaces, form edges which intersect said substantially circular cutting edges in alternate centering points when the block is positioned at the nose of an end mill and provide clearance behind the rake faces respectively when the block is positioned in an end mill for bevel cutting with positive axial rake.

2. A ballnose end mill comprising a tool holder in the form of a generally cylindrical shank having at its cutting end at least two chip gullets each followed by an on-edge cutting insert seated and secured in a recess formed in the shank, each of said inserts having a first major face which is cylindrically convex, an opposite major face which is plane, rhomboidal in outline, with its opposite major edges in chordal relation to said cylindrical major face, and upon which the insert is adapted to be seated in a recess in said shank, a first pair of opposed, plane, minor boundary surfaces which intersect said plane rhomboidal face on said two major edges and diverge therefrom at equal angles to intersect said convex major face at an acute included angle to form therewith two substantially circular cutting edges on said boundary faces, a second pair of opposed, plane, minor boundary surfaces which intersect said plane rhomobidal face perpendicularly on its two minor edges, and a central bore extending between the major faces to receive a securing fastener, said first and second pairs of minor boundary surfaces, by their acute-angle intersection, forming edges which intersect each of said substantially circular cutting edges in a point, said inserts each being positioned with one of said first pair of plane boundary faces disposed as rake faces facing in the direction of rotation of the tool holder and with their respective said cutting edges disposed to sweep portions of a cutting path which is a substantially circular quadrant in projection to a radial plane through the axis of the shank and is continuous from the axis of the shank to the maximum radius of said path measured from said axis, said one rake face of one of said inserts being positioned substantially radially of the shank with its associated point located at the axis of the shank as a centering point and with the cutting edge associated with said point extending from said point along a major portion of said quadrant, said one rake face of the other of said inserts being positioned with negative radial rake and positive axial rake and with the cutting edge thereof extending along a major portion of said quadrant from said maximum radius toward said centering point, the said one rake faces of said inserts being disposed on opposite sides of said axis, and the cutting paths of said inserts positioned as aforesaid overlapping at the mid-portion of said quadrant by a major portion of the length of each thereby to apportion the heavier cutting load between the inserts.

* * * * *